L. T. VELEN.
CRADLE.
APPLICATION FILED AUG. 19, 1908.
981,336.
Patented Jan. 10, 1911.
7 SHEETS—SHEET 5.
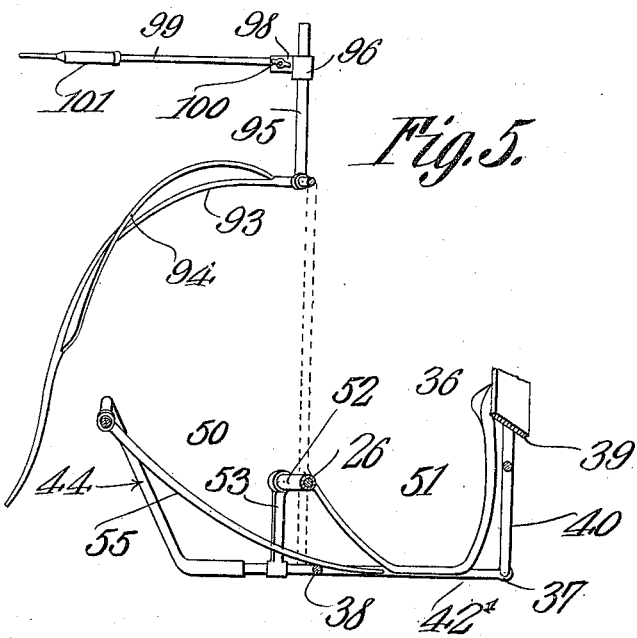
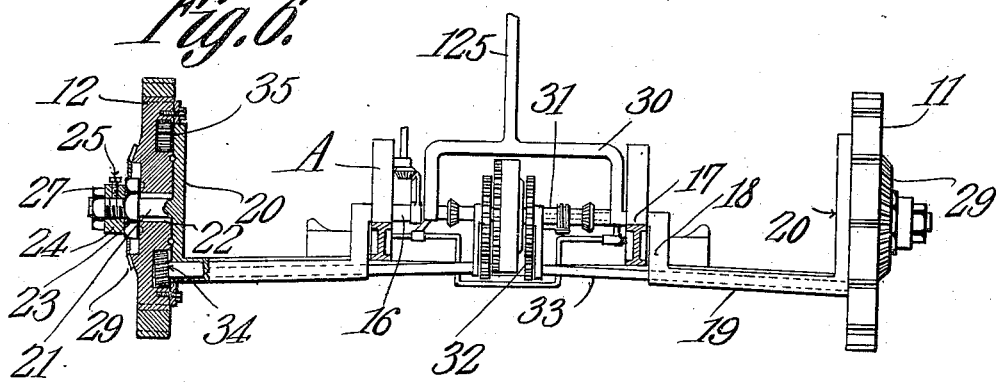
Witnesses
Inventor
Luther T. Velen.
By C. A. Snow & Co.
Attorneys L. T. VELEN.
CRADLE.
APPLICATION FILED AUG. 19, 1908.
981,336.
Patented Jan. 10, 1911.
7 SHEETS—SHEET 6.
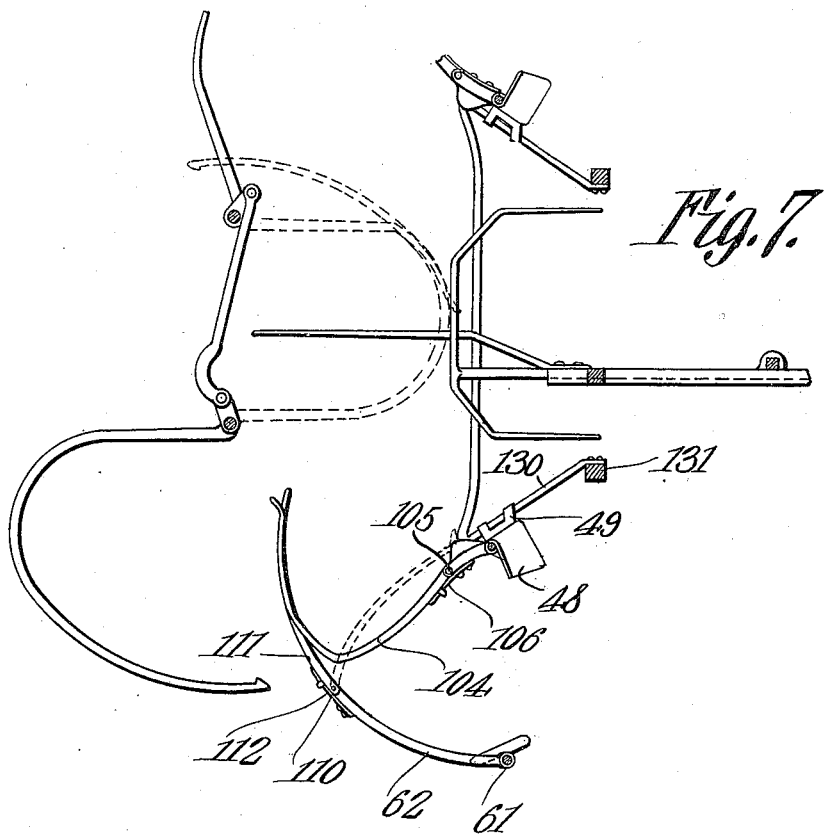
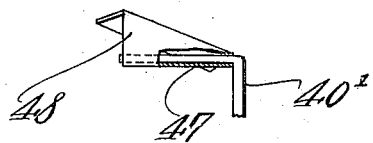
Witnesses
Inventor
Luther T. Velen.
By C. A. Snow & Co.
Attorneys L. T. VELEN.
CRADLE.
APPLICATION FILED AUG. 19, 1908.
981,336.
Patented Jan. 10, 1911.
7 SHEETS—SHEET 7.
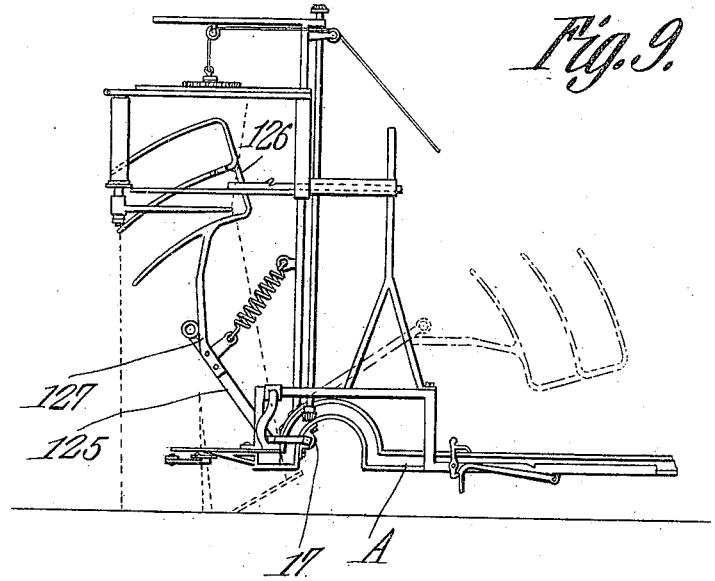
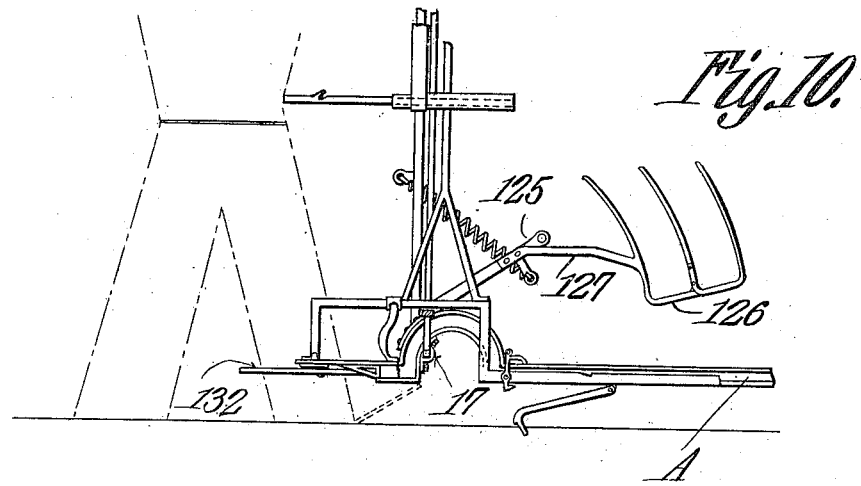

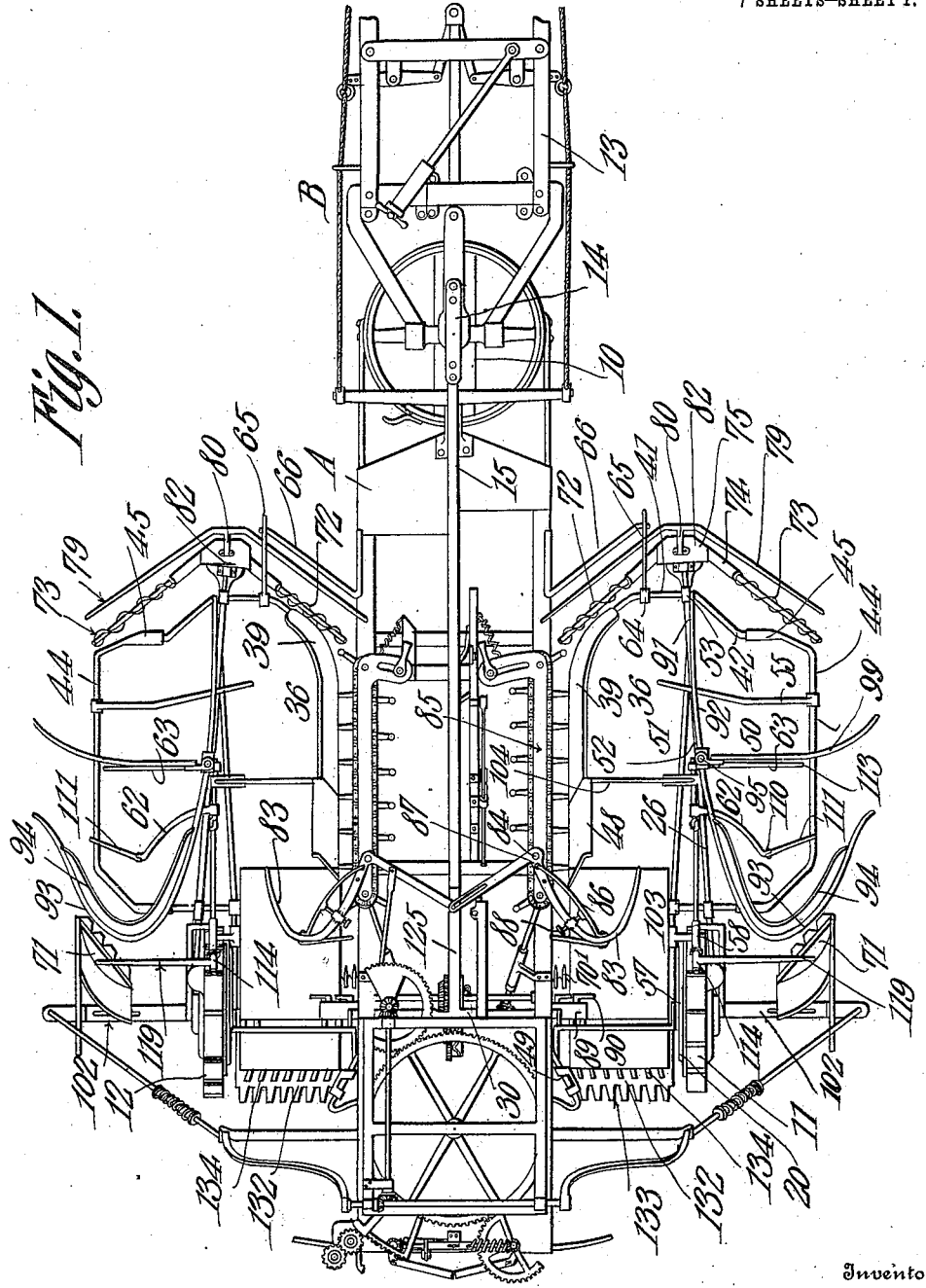

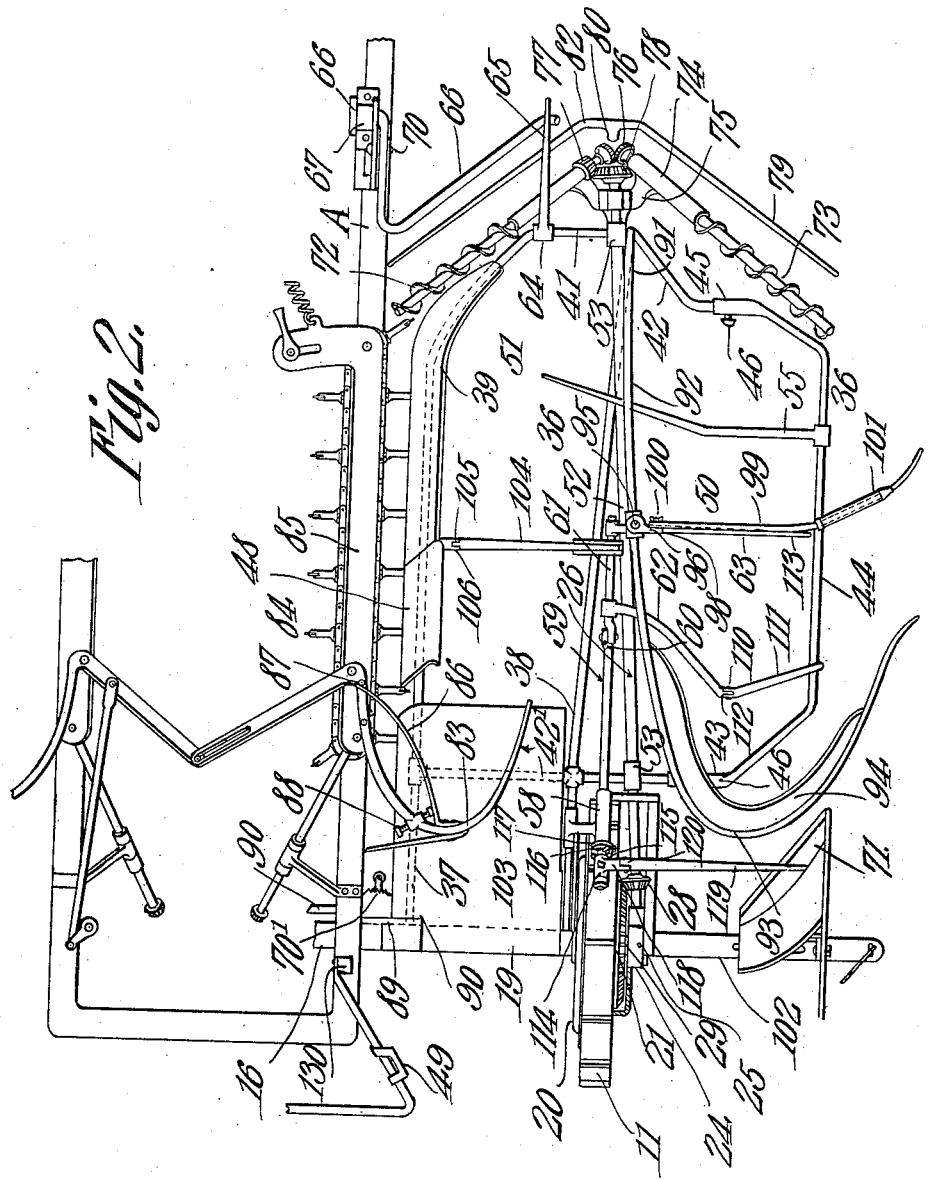

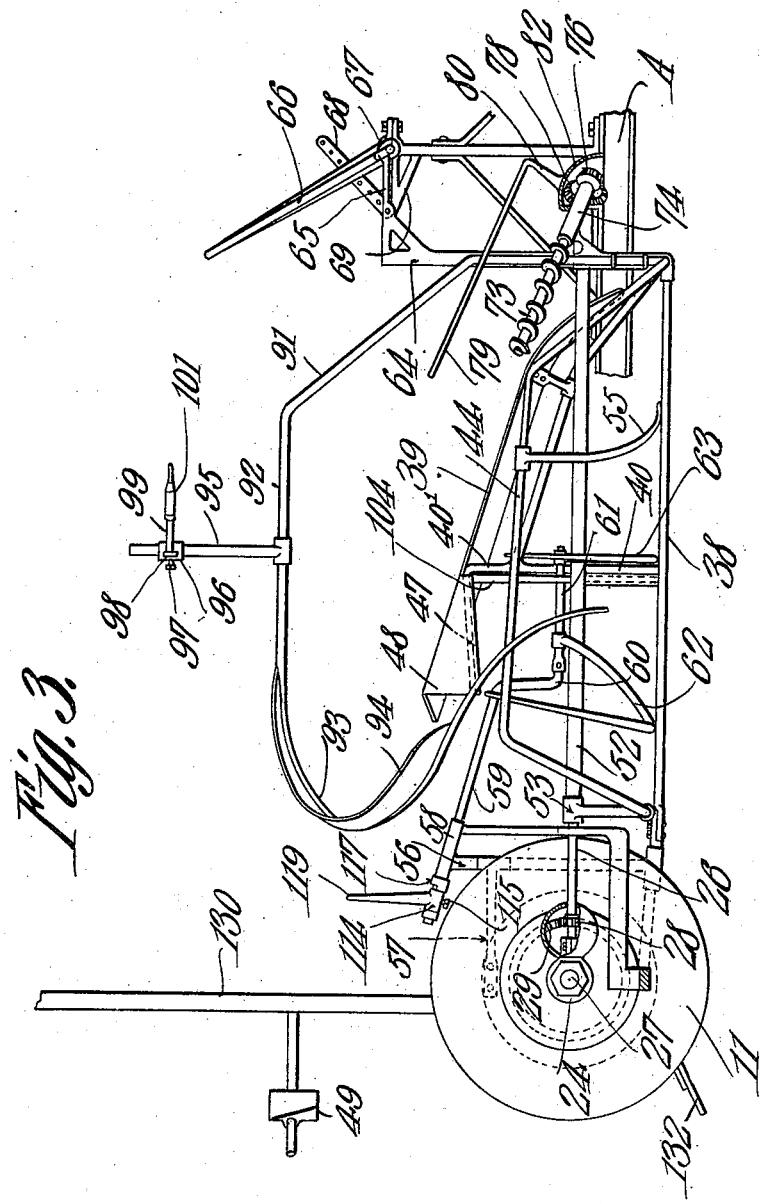

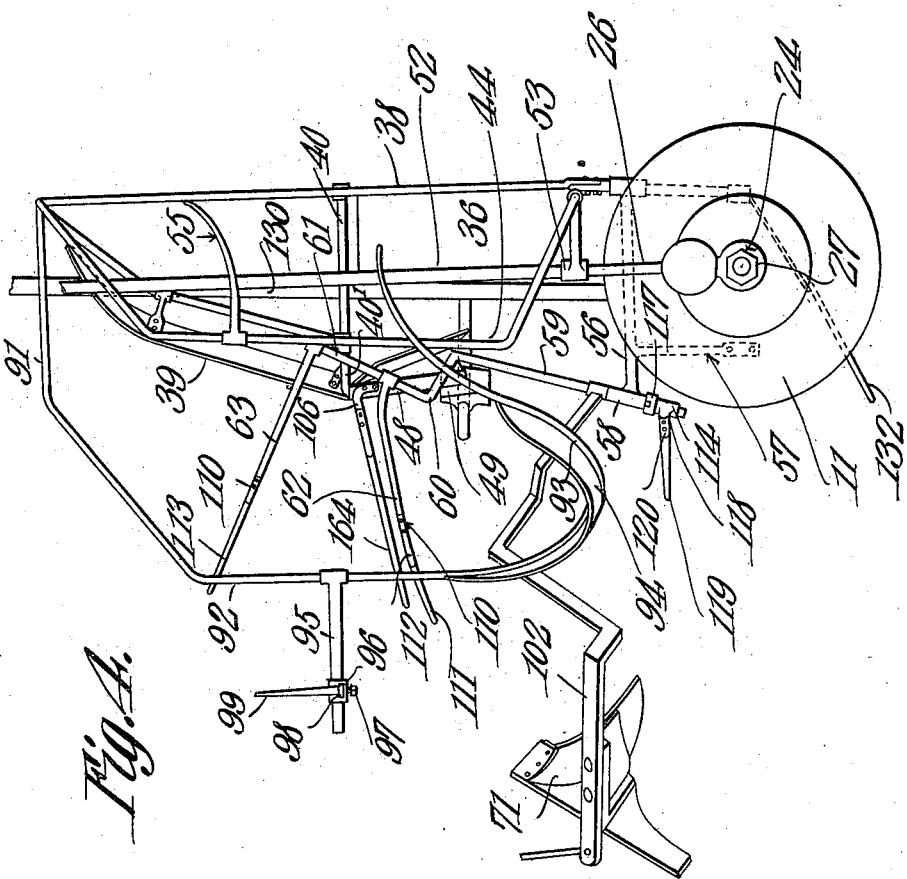

UNITED STATES PATENT OFFICE.

LUTHER THEODORE VELEN, OF CLEBURNE, KANSAS.

CRADLE.

981,336.   Specification of Letters Patent.   Patented Jan. 10, 1911.

Original application filed November 4, 1907, Serial No. 400,553. Divided and this application filed August 19, 1908. Serial No. 449,329.

*To all whom it may concern:*

Be it known that I, LUTHER T. VELEN, a citizen of the United States, residing at Cleburne, in the county of Riley and State of Kansas, have invented new and useful Cradles, of which the following is a specification.

This invention has relation to cradles for corn harvesters and the like, and it consists in the novel construction and arrangement of its parts, as hereinafter shown and described.

The principal object of the invention is to provide a cradle adapted to be used with mechanism for cutting four rows of corn at a single operation, and which will act to receive the stalks as they are cut from the four rows and hold the stalks until bundles have accumulated, which bundles are then brought together to form a shock.

A further object of the invention is to provide a machine of this type, with cradles, into which stalks of the four rows will fall as they are cut.

A still further object of the invention is to provide in a machine as described means whereby the corn from the four rows is assembled on to separate cradles divided into two compartments and the cradles being so constructed and operated as to finally bunch the stalks from all of the compartments into the form of a single shock.

A still further object of the invention is to provide means for guiding the stalks of corn into cutting position in case they should be slightly out of alinement or partly bent or broken.

A still further object of the invention is to provide revoluble helices or screws adjacent the entrance ends of the stalk guides or guards for the purpose of raising the bent or broken stalks.

In the accompanying drawings,—Figure 1 is a plan view of a corn harvester equipped with the cradles. Fig. 2 is a plan view of one of the cradles drawn to an enlarged scale. Fig. 3 is a side elevation of the mechanism shown in Fig. 2. Fig. 4 is a side elevation of the cradles in elevated position.
Fig. 5 is a transverse sectional view of the cradles looking toward the rear of the machine. Fig. 6 is a rear elevation with parts in section of the mechanism for swinging the cradles. Fig. 7 is a sectional plan view of the mechanism for discharging the stalks from the cradles and assembling the same in the form of a shock. Fig. 8 is a detail view of a portion of this mechanism illustrating principally the actuating cam of the inner delivery arm. Fig. 9 is a side elevation of a portion of the mechanism at the rear of the machine showing principally the shock-dividing fork and means for assembling, binding and delivering the shock. Fig. 10 is a view similar to Fig. 9, showing the parts in a different position.

The machine as a whole is propelled and actuated by draft animals, and, if desired, an engine or motor may be placed upon the frame of the machine, to assist the animals.

In the arrangement of the parts of the mechanism hereinafter shown and described, a draft appliance and steering mechanism are arranged on a separate frame in advance of the main frame which carries the cradles and the shock-forming mechanisms.

The shock-forming mechanisms are carried by frame "A", and the draft mechanism is supported by a frame "B", while the structure as a whole is supported by three wheels, 10, 11 and 12. The wheel 10 is the steering-wheel and is located under the frame "B". The draft frame 13 is mounted upon the frame "B", and is connected by means of a link 14 with a draft bar 15 which extends longitudinally along the middle of the frame "A".

The axle 16 is transversely disposed with relation to the frame "A" and is journaled in the side bars of the said frame at the point 17. At points beyond the side edges of the frame "A" the said axle 16 is turned down forming the arms 18, which are then bent outward to form the sleeves 19. Said sleeves are disposed at a slight angle to the horizontal, the outer ends thereof being lowermost and to the outer end of each sleeve portion 19 is secured a solid disk 20, the outer face of which bears against the inner face of one of the supporting wheels of the frame "A". The spindle 21 projects from the central portion of the disk 20 and the supporting wheel is provided with an opening of much greater diameter than the spindle, bearing-rollers 22 being interposed between the spindle and the wall of the wheel opening to reduce friction. The outer end of the spindle 21 is threaded and receives a nut 23. The threaded end of the said spindle projects some distance beyond the nut and carries a block 24 that is held in place by a set-screw 25 and which forms a bearing for the rear end of a shaft 26 through which motion is transmitted to certain mechanism for straightening the cornstalks and directing them into the path of the cutters, as is more fully described hereinafter. The block is further held in place by an auxiliary jam-nut 27 that is mounted on the outer end of the spindle. The shaft 26 carries a beveled pinion 28 that intermeshes with a beveled gear 29 that is secured to or formed integral with the outer face of the driving wheel.

The axle 16 is provided at its middle with the arched portion 30, and between the ends of the said arched portion is journaled the shafts 31 which are adapted to receive rotary movement from the supporting wheels through the intermeshing gears 32 and the shafts 33, which are journaled for rotation in the sleeves 19 and which are provided at their outer ends with the pinions 34 which mesh with the internal gears 35 provided within the said supporting wheels. The said shafts 31 are designed to operate other mechanisms pertaining to the harvester upon which the cradles are mounted and a further description of their functions in the present case is unnecessary.

At each side of the machine is arranged a cradle 36 that preferably is constructed of light rods or tubing. The rear ends of tubes 37 and 38 of the frame are rigidly secured to the sleeve portions 19 of the main axle, and these tubes carry not only the cradle, but, also, the mechanism for cutting the outer row of corn; for directing the corn laterally toward cutting position, and the mechanism which gathers the cut stalks and effects the preliminary assembling in shock form.

The inner tube 37 is continued forward in parallel relation with the side of the frame "A" but at some distance below the horizontal plane thereof to a point in vertical alinement with the rear end of the guiding plate 39, and thence is bent upward in a vertical line forming an arm 40. The tube is thence bent forward and downward in a direction approximately parallel with and under the plate 39 and near its outer end is turned downward at a more abrupt angle and is also bent outward, following the curvature of the outer end of the plate 39. The tube is then bent in a direction at a right angle to the length of the main frame forming an arm 41, and thence rearward and outward, terminating in a laterally projecting end portion 42. The tube 38 extends forward in a practically straight line, and is connected at its forward end to the portion 41 of the cradle. Extending at an angle to the plate 39 is the rear cradle-bar or tube 42', that is secured to both the tubes 37 and 38 and at its outer end is arranged to fit within a socket 43 formed at the end of the outer tube 44 of the cradle. The forward end of the tube 44 has a socket 45 which fits over the end 42 of the main tube, and said socket members are secured in place by set screws 46. The outer tube 44 is bent upward to form the outer side of the cradle, and, when necessary, may be detached by loosening the set screws 46 in case the machine is employed for cutting only two rows of corn. An angular arm 40' is mounted upon the tube 40 and forms a spindle 47 on which is mounted the angularly bent plate 48 that normally is in alinement with and forms a continuation of the guiding plate 39. This plate 48 serves as a cam for engagement with a fixed stop 49, whereby the stalks cut from the outer rows are thrown from the cradles for the formation of a shock, more fully described hereinafter.

Each cradle is divided longitudinally into two compartments 50 and 51, by a horizontally disposed tube 52, the opposite ends of which are rigidly secured to vertical braces 53, that are carried by the brackets 41 and 42 of the cradles, and the outer compartments 50 will receive the corn from the outermost row, while the inner compartment 51 will receive the corn cut from one of the inner rows. In order to form an additional support for the stalks entering the outer compartments an auxiliary transverse arm 55 is secured to the outer tube 44 of the cradles, and extends inward and downward across the tube 38 and forming a partial bottom for the compartment 51.

The cradle structure is further provided with a vertically disposed arm 56 that is rigidly connected by an arm 57 to the disk 20 of the axle 16. At the outer end of this arm is a sleeve 58 that is inclined approximately at an angle of 15 degrees and serves as a bearing for an inclined shaft 59 that extends forward over the central portion of the cradle, thence is bent downward forming a crank 60 to which is secured a crank-pin 61, the pin being detachably connected with the arm 60 so that it may be removed when only two rows of corn are being cut. To this crank-pin are secured two arms 62 and 63, which are curved and normally lie at the bottom of the cradles in position to receive the stalks cut from the outer row.

In order to support the forward ends of the cradles, each cradle is provided with a vertically extending bracket 64, having a horizontally disposed forwardly extending arm 65, the outer end of which is slightly recessed and is adapted to rest within the hook-shaped lower end of an arm 66. The arm 65 is carried by a revoluble adjustable shaft 66 that is mounted in a bearing at the upper end of a bracket 67 carried upon the frame "A" of the machine, and said arm is bent into approximately V shape, corresponding in general to the contour of the approach to the knives. The upper, or arched portion of this arm 66 is arranged to engage the upper portions of the stalks of corn, and bend the latter forward so that they may be presented to the gathering chains at an angle, it being understood that the cutting action will be more efficient when the stalks are bent over and subjected to slight strain on that side which is first attacked by the knife. The height of this deflecting and cradle-supporting arm may be adjusted by slightly turning the rock-shaft, and in order to lock the arm in adjusted position a pivoted lock-bar 68 is carried by a bracket 69, projecting from the standard 67, said arm having a plurality of openings which may be brought into alinement with one or more openings in the arm, and the latter locked in an adjusted position by a bolt 70.

The forward end of each cradle is approximately V shaped, tapering from the sides to a central point, in order that the cradle may be properly guided between two adjacent rows of corn, one row passing to the inner reciprocatory cutters 70′ and the outer row passing down along the outer edge of the cradle to a relatively stationary cutter 71. Where the rows of corn are uneven, it is desirable to provide means whereby any stalks out of alinement may be directed to the opposite sides of the cradle, and for this purpose a pair of revoluble deflectors 72 and 73 are employed. Each of these is in the form of a shaft provided with a helically arranged rib or blade which, during the rotation of the shaft, will engage the stalk or stalks of corn and feed the same laterally to one or other side of the cradle. The two shafts are arranged as at an obtuse angle to each other and are mounted in bearing sleeves 74 carried by brackets 75 that are secured to the forward carrying brackets 53 of the tube 52. The adjacent ends of these shafts are connected by beveled gears 76 and the shaft of the deflector 72 is provided with an additional beveled pinion 77, that is in constant mesh with a beveled pinion 78 on the forward end of the shaft 26, which shaft, as before described, carries a beveled pinion 28, intermeshing with a beveled gear 29, on the ground wheel. As long as the machine is traveling forward, the ground wheel will transmit motion through the gearing described to the helical deflectors, and any corn-stalks that may be out of alinement will be directed laterally over the sides of the cradle. The helical deflectors 72 serve further as lifters, and by engagement with fallen or bent stalks, will tend to move the same to perpendicular position, as they are directed to the sides of the cradle. As an additional deflecting means, a pair of angularly related arms 79 are located above and slightly in advance of the helical deflectors. These arms 79 are rigidly secured at their inner ends to a bracket 80 that is carried by the gear casing 82 that surround and protect the beveled gear drive of the helical deflectors.

In order to insure the bending of the stalks of corn forward and subjecting the rear surface of the stalks to the desired tensional strain for presentation to the cutting knife, a pair of "U" shaped arms 83 are employed. These arms are pivoted on pins 84 carried by the bar 85 which in turn is arranged upon the frame "A." The arms 83 are arranged in such position as to move the upper ends of the stalks forward and bend the stalks in readiness for cutting, and as a preliminary, to lay the stalks in the cradle. Each arm carries a yieldable spring 86, one end of which is rigidly secured to the arm 83 at a point about midway the ends of the latter and the free end of the spring engages against the stop-pin 87 that is carried by the arm. The spring may be strained by a set screw 88 passing through a threaded bore in the arm and the stress of the spring being adjusted in accordance with the condition of the corn. As each stalk of corn is engaged by the spring, the latter will yield and the stalk will ride against the curved surface of the spring and will be deflected laterally, so that its top will be over the cradle, while its butt will stand in the channel of approach to the cutter. As the forward movement of the machine continues, the stalks will spring past the rear end of the plate 48 and the spring 86 will again move forward, so that the stalk of corn will be held out of the channel of approach with its top over the cradle and in such position that when the butt is severed by the knife, the stalk must fall into the cradle with its top directed toward the mean longitudinal line of the cradle, while its butt strikes against the plate 89 arranged in the rear of the said cutter and is thereafter fed over laterally by reciprocating feeding pawls 90, so that all of the stalks will be disposed in approximately parallel relation. Extending upward from the front end of the cradle is an arm or tube 91 that is bent rearward and upward and thence rearward in a horizontal plane forming an arm 92, from the rear end of which extends an approximately sigmoidal guide or depressor 93, the extreme end of which projects some distance beyond the outer edge of the cradle in order to engage with all of the stalks of corn of the outer row. This deflector further carries a plate 94 that is inclined forward and upward in the direction of its width and serves to afford a broader engaging surface, at the same time to strengthen and reinforce the arm 93. This deflector will engage with the stalks of corn and bend the same so that the tops of the stalks will be directed over the cradle and the stalks will be bent forward so that their rear surfaces will be subjected to strain at the point where they are cut by the cutting blade, in order to render the cutting operation more effective.

In order to operate on corn-stalks, the arm 92 is provided with a vertical standard 95 carrying a collar 96 which may be adjusted vertically of the standard in accordance with the height of the stalks, and then locked in place by a set screw 97. From this collar projects an arm 98 which carries a curved arm or deflector 99, the outer end of which projects beyond the side of the cradle and is arranged to engage with the corn-stalks in advance of their engagement by the deflector 94. The arm 99 is connected with the arm 98 by a pivot bolt carrying a wing-nut 100, which will permit raising and lowering of the outer end of the deflector, after which the deflector may be locked in adjusted position by turning the said wing-nut. The deflector arm 99 is further provided with a loosely journaled roller 101, which lies vertically above the stalks that pass along the outer edge of the cradle and which is adapted to prevent the leaves or foliage of the corn from wrapping around the said deflector arm 99.

The stalks of the outer row fall into the outer compartment 50 of the cradle and rest partly on the bar 102 at the rear of the cradle and upon the arms 55, 62 and 63, while the stalks from the intermediate row, as previously described, fall into the compartment 51 of the cradle and rest upon the plate 103 and an auxiliary arm 104. The arm 104 is permanently secured to the cam bar 48, and with the latter is pivoted on the arm 40 of the cradle. The arm 104 is shown as formed of two sections pivoted at 105, and normally held in working position by a small leaf spring 106, which spring will permit yielding of the outer portion of the arm, in case the latter is subjected to such strain as would otherwise lead to breakage.

The description up to the present time has been confined to the mechanism for guiding and deflecting the corn, cutting the stalks, and for depositing the stalks of the outer row into the compartment 50 of the cradle, and the depositing of the stalks of the inner row in compartment 51 of the cradle. As there is a cradle at each side of the machine, and four rows of corn are cut at the same time, it follows that after working a short time, four separate bundles of stalks have been accumulated in the several compartments. From this point the mechanism is designed to gather the four bundles or piles of stalks together into the form of a single shock.

Briefly, the operation consists in swinging the cradles upward and rearward with the main axle as a center of movement. During the preliminary portion of this movement, the stalks in the outer compartment 50 are lifted into the compartment 51, this being accomplished before the cradles reach the vertical position. At the time the vertical position is reached, the arm 104 of the cradle discharges all of the contents of the compartment 51, and the two double bundles of stalks are subsequently brought together to form a shock. During this operation provision is made for holding the butt-ends of the four bundles of stalks separated from each other, so that when the shock is deposited on the ground, it will have four supporting columns or bundles that are spaced from each other below the tying point, in order to form a wide base that will insure the shock remaining in upright position, and further to permit free ventilation and prevent the spoiling of the corn through overheating. The corn from the outer compartment 50 is thrown over into the inner compartment 51 by the two arms 62 and 63. Each of these arms is formed of two sections that are connected together by pivots 110. The outer section 111 of the arm 62 being normally held at an angle to the inner section by a spring 112, and remaining in this position until after the bundle of stalks has been thrown from the outer to the inner compartment of the cradle. In similar manner the outer section 113 of the arm 63 is held in angular relation to the inner section by a spring. Both of these springs yield as the outer sections of the arms move into alinement with or form continuations with the inner or main sections when the two bundles of stalks are being discharged from the inner compartment of the cradle as will hereinafter appear.

To the rear of the shaft 59 is secured a sleeve 114, which may be adjusted circumferentially of the shaft and locked in place by a set screw 115, and from one end of the sleeve projects a pin 116, that is arranged to engage against a pair of shoulders formed on a stock collar 117 that is adjustably secured to the end of the stationary bearings 58, and these two relatively adjustable blocks will serve to limit the extent of revoluble movement of the shaft 59.

From the sleeve 114 projects an arm 118, to which is pivoted a butt-separating finger 119, this finger being normally held in alinement with the arm 118 by a spring 120, which spring will permit yielding movement of the arm as the latter is withdrawn from between the bundles of stalks.

The stalks from the outer row which are deposited in the compartment 50 of the cradle will fall below the separating finger 119, and when the shaft 59 is revolved for the purpose of carrying the arms 62 and 63 over and depositing the outer bundle of stalks upon the stalks of the inner compartment of the cradle, this separating finger will remain between the butts of the stalks of the two bundles, and will remain in this position until after the stalks are turned to vertical position in the formation of a shock.

As the finger is yieldable at its pivot point, it may be withdrawn from its position without disturbing the bundle or tending to overturn the shock. In order to turn the cradle to vertical position and discharge the bundles of stalks therefrom, as well as to operate the shock-discharging and tying mechanism, the draft animal or animals are backed, and this movement will bring the cradles into vertical position as will hereinafter appear. Projecting from the upper portion of the intermediate arch portion 30 of the axle 16 is an arm 125 that normally occupies a position at an angle of 40 or 45 degrees to the horizontal when the cradle is down, and this arm is coupled with the draught bar 15, and as the said draft bar is connected at its forward end with the draft frame 13, it is obvious that when the draft animals are backed and the frame 13 is moved back that the movement is transmitted through the bar 15 to the arm 125, turning the latter through an arc of approximately 90 degrees. This operation is accomplished with the axis of the shaft 16 as a center of movement. This will carry the sleeve 19 and the disk 20 around with the spindle 21 as a center of movement, and the ground wheels being stationary, the pinions at the ends of the shaft 33 will be revolved, causing the pinions 32 at the inner ends of said shaft to ride around the pinions upon the shaft 31 so that no movement will be transmitted to the cutter or other parts which depend upon the said shaft 31 for movement. As the rods 37 and 38 of the cradles are rigidly secured to the axle, said cradles will be started in their upward and rearward movement and all of the mechanism supported by the cradles will, also, be carried up.

In order to prevent the bundles from one cradle falling sidewise to the ground in case the stalks from that cradle should be discharged in advance of the stalks from the other, and to assist in maintaining the shock in vertical position during its formation, a dividing fork 126 is employed. This fork is shown as formed of a number of tines, and is provided with a carrying arm 127 that is rigidly secured to the arm 125. As the arm 125 and the cradle is moved to the discharging position, this fork will be raised until the arm 127 is approximately vertical, and as the fork is located in the exact longitudinal center of the machine, it will form a rest against which the tops of both the double bundles of stalks may fall preliminary to the tying operation.

The arm 104 operates to discharge the bundles of stalks from the compartment 51 of the cradle. For this purpose a bar 130 is secured to each side of the rear frame, and each said bar 130 carries a cam 49. These cams are disposed in the path of movement of the cam plates 48 which carry the arms 104 and near the upward limit of movement of the cradle, the cam 48 will engage one of the stationary cams 49 so that the arm 104 will be swung around and will carry two bundles of stalks in the direction of the dividing fork 126, it being understood that only the upper ends of the stalks are thus engaged by the arm 104, while the butt-ends of the bundles are separated by the finger 119. At the beginning of the movement of the arm 104, the outer sections 111 and 113 of the arms 62 and 63 are still disposed at an angle to the inner end of the arm, but as the discharging movement of the arm 104 progresses the connecting springs of the sections of the arms 62 and 63 will yield until the outer sections are moved into alinement with the inner or main sections by engagement with the bundles of stalks, and the latter will be carried from the cradles against the dividing fork 126. At this stage of the operation, the tops of the stalks which constitute the shock are divided into two parts by the fork 126, while the butt-ends of the stalks are divided into columns preparatory to being deposited upon the ground. The machine also carries at its rear end a spreader board 132 down which the butt-ends of the stalks are adapted to slide upon the ground, and the spreader-board is provided with the teeth 133, for the purpose of effectually separating the butt-ends of the stalks as they are placed upon the ground, and the said board is also provided with the ribs 134, adapted to assist the operation as above described.

As above described, during the upward movement of the cradle and subsequent shock-assembling operation, the forward end of the machine as an entirety is stopped by reason of the fact that the draft animals are backed for the purpose of operating the cradles and assembling parts.

The subject matter of the present invention is divided from my earlier application for patent for harvester filed in the Patent Office November 4, 1907, Serial No. 400,553.

Having described my invention, what I claim as new, and desire to secure by Letters Patent, is:—

1. In a harvesting machine a vertically swinging cradle divided into two parallel compartments, each arranged to receive the stalks from a different row, and a stalk-cutter located at the end of each compartment.

2. In a harvesting machine a vertically tilting cradle divided into a pair of parallel compartments, each arranged to receive the stalks from different rows, means for directing the stalks into the cradle, and a stalk-cutter located at the end of each compartment.

3. In a harvesting machine a cradle divided into a pair of parallel compartments, each arranged to receive the stalks from a different row, means for dumping the contents of one compartment into the other compartment, and a stalk-cutter located at the end of each compartment.

4. In a harvesting machine a cradle divided into a pair of parallel compartments, each arranged to receive the stalks from a different row, means for dumping the contents of one compartment into the other compartment, means for dumping the entire contents from the last said compartment, and a stalk-cutter located at the end of each compartment.

5. In a harvesting machine a cradle divided into parallel inner and outer compartments, each arranged to receive stalks cut from a different row, means for dumping the contents of the outer compartment into the inner compartment, means for discharging the contents of the inner compartment, and a stalk-cutter located at the end of each compartment.

6. In a harvesting machine, a pivotally mounted cradle divided into inner and outer compartments, stalk-receiving arms forming the bottom of said compartments, means for moving said arms to first dump the contents of the outer compartment into the inner compartment, and then to finally discharge the entire contents of the inner compartment, and a stalk-cutter located at the end of each compartment.

7. In a harvesting machine a cradle divided into inner and outer compartments, each arranged to receive stalks from different rows, means for dumping the stalks from the outer compartment into the inner compartment, means for holding the butt ends of the stalks of the outer compartment separate from those of the inner compartment, and a stalk cutter located at the end of each compartment.

8. In a harvesting machine a cradle divided into inner and outer compartments each arranged to receive stalks cut from a different row, means for dumping the stalks from the outer compartment into the inner compartment, means for holding the butt ends of the stalks in the outer compartment separate from those in the inner compartment, means for discharging the entire contents of the inner compartment, and a stalk-cutter located at the end of each compartment.

9. In a harvesting machine a pivotally mounted cradle arranged to tilt in a vertical path to discharge its contents, said cradle being divided into inner and outer compartments, each arranged to receive the stalks from a different row, means operating to dump the stalks from the outer compartment into the inner compartment during the upward movement of the cradle, and a stalk-cutter located at the end of each compartment.

10. In a harvesting machine a cradle pivoted at its rear end and arranged to swing in a vertical plane to discharging position, said cradle being divided into inner and outer compartments, each arranged to receive the stalks cut from a different row, and a stalk-cutter located at the end of each compartment.

11. In a harvesting machine a vertically tiltable cradle divided into inner and outer compartments each arranged to receive stalks cut from a different row, a pivotally mounted arm forming the bottom of the inner compartment, and upon which the stalks fall, means including an arm in the outer compartment to dump the stalks therefrom into the inner compartment, means for holding the butt ends of the stalks of the two compartments separated during and after the dumping operation, means for moving the arm of the inner compartment to finally discharge the entire load of stalks, and a stalk-cutter located at the end of each compartment.

12. In a harvesting machine a vertically tiltable cradle divided into inner and outer compartments arranged to receive stalks cut from a different row, a shaft forming a portion of the compartment dividing means, arms carried by said shaft and constituting a portion of the bottom of the outer compartment, a dividing finger also carried by the shaft and arranged to separate the butt ends of the stalks from the inner and outer compartments, means for turning the shaft during the tilting movement of the cradle to force the arms of the outer compartment to discharging position, a pivotally mounted arm forming the bottom of the inner compartment, means for moving the said arm to finally discharge the entire load of stalks at the completion of the upward movement of the cradle, and a cutter located at the end of each compartment.

13. In a harvesting machine a vertically tiltable cradle divided into inner and outer stalk-receiving compartments, a knife located at each side of the cradle, and tiltable therewith, a stalk-deflecting means also carried by the cradle and movable with the cradle to and from stalk-discharging position.

14. In a harvesting machine a vertically tiltable cradle divided into inner and outer compartments, cutting blades arranged at opposite sides of the cradle, at the rear end thereof, a shaft forming a portion of the compartment-dividing means, arms carried by the shaft and forming the bottom of the outer compartment, a dividing finger carried by the shaft and serving to hold separated the butt ends of the stalks of the inner and outer compartments, and an arm extending from the shaft and serving as a support for the outer cutting blade, said arm being movable in a plane approximately at right angles to the plane of movement of the cradle and serving to transmit discharging movement to said arms.

15. In a harvesting machine a tiltable cradle divided into inner and outer compartments, stalk-discharging arms forming the bottoms of said compartments, means for operating the arms of the outer compartment to effect the discharge of the stalks therein into the inner compartment during the upward movement of the cradle, a cam bar connected to the arm of the inner compartment, a stationary arm with which said cam bar engages during the upward movement of the cradle to thereby swing the inner arm to discharge position, and a cutter located at the end of each compartment.

16. In a corn harvesting machine a cutting blade, a vertically tiltable cradle normally occupying a horizontal position in advance of and to one side of the blade, a pivotally mounted stalk-deflector for moving the stalks laterally over the cradle, said deflector being movable out of the path of the cradle during the tilting operation of the latter.

17. In a corn-harvesting machine a frame, a pair of cutting blades, a pair of vertically tiltable cradles arranged at the side of and in advance of the cutting blades, pivotally mounted deflector arms normally extending over the edges of the cradles, and serving to bend the stalks laterally over the edges of the cradles, and means for connecting said arms for mutual movement.

18. In a corn-harvesting machine a pair of cutting blades, a pair of vertically tiltable cradles arranged at the side of and in advance of the blades, a pair of pivotally mounted deflector arms normally extending over the sides of the cradles, adjustable springs carried by said arms and arranged to engage with and bend the stalks over the edges of the cradles in advance of the knives, and a pin and slot connection between the inner ends of the arms.

19. In a harvesting machine a cutting blade, and a revoluble helical deflecting blade disposed in a line oblique to the path of travel of the machine and serving to direct fallen stalks into the path of the blade, and a cradle located between the deflector and the cutting blade.

20. In a harvesting machine a cutting blade, a receiving cradle, the side of which forms a guide for directing the stalks into the path of the blade, and a revoluble helical deflector blade disposed obliquely to the path of travel of the machine and supported at the forward end of the cradle.

21. In a harvesting machine a receiving cradle arranged to travel between two adjacent rows of stalks, the front end of the cradle being tapered toward a central point, cutters located at the end of the cradle, a pair of obliquely disposed deflectors extending from the pointed forward end of the cradle to the sides thereof, each deflector being in the form of a blade, gearing connections between the deflectors, and a driving shaft for imparting movement to said gearing connections.

22. In a harvesting machine a stalk-receiving cradle arranged to travel between two adjacent rows of stalks, the forward end of the cradle tapering toward a central point, a pair of obliquely disposed deflectors arranged at the front end of the cradle and each comprising a shaft having a helical blade mounted thereon, a driving shaft, gearing connections between the shaft and the deflector, and cutters arranged at the rear ends of the side portions of the cradle.

23. In a harvesting machine a receiving cradle arranged to travel between two adjacent rows of stalks, the forward end of the cradle being pointed, cutters located at the rear end of the cradle, obliquely disposed helical deflectors for raising fallen stalks and directing the same toward the sides of the cradle, gearing connections for said deflectors, a gear casing, and an auxiliary deflecting bar carried by the casing and having deflecting fingers inclined to correspond to the oblique positions of the helical deflectors.

24. In combination, a pivotally mounted stalk receptacle substantially horizontally disposed when receiving the stalks, and adapted to turn on its pivot toward vertical position to discharge the cut stalks, and a cutter at one side of the receptacle near the rear end thereof, mounted for movement about the axis of the receptacle.

25. In combination, a pivotally mounted stalk receptacle, a stalk cutter attached thereto, a longitudinally movable draft member, and means for turning said receptacle to discharging position by the longitudinal movement of said draft member.

26. In a harvester, a main frame, a pivoted stalk receptacle, a cutter attached thereto, and a yoke extending upwardly and laterally from said frame and across the row of stalks to be harvested, and forming a support for the front end of the receptacle.

27. In a harvester, a pivotally mounted stalk receptacle, a cutter attached thereto, a stalk deflector overhanging said receptacle, means for tilting said receptacle, and means for moving said deflector out of the path of movement of said receptacle.

28. In a harvester, a main frame, a pivotally mounted stalk receptacle adapted to receive stalks from different rows, cutters attached to the receptacle, a stalk deflector for directing the stalks from the outer row toward said receptacle, mounted to rotate with said receptacle, and a stalk deflector for directing the stalks of the inner row carried by said frame.

29. In a harvester, a pivotally mounted stalk receptacle, a cutter attached thereto, a stalk deflector overhanging said receptacle, means for directing stalks into said receptacle, means for turning said receptacle on its pivot, and means for moving said deflector out of the path of movement of said receptacle.

In testimony that I claim the foregoing as my own, I have hereto affixed my signature in the presence of two witnesses.

LUTHER THEODORE VELEN.

Witnesses:
C. A. G. SUNDSTROM,
ADOLF BERGHEIMER.